(12) United States Patent
Wozny

(10) Patent No.: US 8,251,303 B2
(45) Date of Patent: Aug. 28, 2012

(54) HARD DRIVE DESTRUCTION SYSTEM

(76) Inventor: Scott Anthony Wozny, New York, NY (US)

( * ) Notice: Subject to any disclaimer, the term of this patent is extended or adjusted under 35 U.S.C. 154(b) by 120 days.

(21) Appl. No.: 12/785,415

(22) Filed: May 21, 2010

(65) Prior Publication Data

US 2010/0294865 A1 Nov. 25, 2010

Related U.S. Application Data

(60) Provisional application No. 61/180,841, filed on May 23, 2009.

(51) Int. Cl.
*B02C 19/00* (2006.01)
(52) U.S. Cl. ............... 241/278.1; 241/280; 241/100
(58) Field of Classification Search ............ 241/278.1, 241/280, 236, 100, 36; 451/5, 6, 451
See application file for complete search history.

(56) References Cited

U.S. PATENT DOCUMENTS

| | | | |
|---|---|---|---|
| 2,620,138 A * | 12/1952 | Vazieux et al. ............ 241/265 |
| 3,570,648 A | 3/1971 | Gillespie, Jr. et al. |
| 4,182,082 A * | 1/1980 | Meyer ............................ 451/24 |
| 4,262,453 A * | 4/1981 | Parigot et al. ................. 451/215 |
| 4,580,368 A * | 4/1986 | Smith ............................... 451/5 |
| 4,655,403 A * | 4/1987 | Sciortino ........................ 241/92 |
| 5,009,038 A * | 4/1991 | Yoshikawa et al. ............. 451/11 |
| 5,301,473 A * | 4/1994 | Seear ............................ 451/367 |
| 5,954,569 A * | 9/1999 | Hutchison et al. ............. 451/63 |
| 6,334,582 B1 | 1/2002 | Castronovo |
| 2002/0070300 A1 | 6/2002 | McLean et al. |

OTHER PUBLICATIONS

Security Engineered Machinery, Model: 22HDD, Technical Data Sheet, Aug. 18, 2005, retrieved from the internet: <htp://www.semshred.com/stuff/contentmgr/files/0/769bebc6af6e4daa2fc2bc4847db9370/folder/Model%2022HDD%200705.pdf>, 2 pages.
International PCT Search Report and Written Opinion dated Jul. 20, 2010 for PCT Patent Application No. PCT/US2010/035881 (filed May 21, 2010), 11 pages.

* cited by examiner

*Primary Examiner* — Faye Francis
(74) *Attorney, Agent, or Firm* — Davis Wright Tremaine LLP; George C. Rondeau, Jr.; Heather M. Colburn

(57) ABSTRACT

A system for destroying a memory device (e.g., a hard drive) having data stored thereon. The system has a grind chamber with a rotatable grind wheel positioned therein. A pressure arm presses the memory device against the grind wheel as the grind wheel rotates. The rotating grind wheel grinds the memory device into particles from which the data stored on the memory device cannot be recovered. The particles are collected in a receptacle adjacent the grind wheel. The system may include a plurality of guides configured to maintain the memory device in a substantially stationary position relative to the pressure arm as the grind wheel grinds the memory device into particles.

14 Claims, 16 Drawing Sheets

HARD DRIVE DESTRUCTION SYSTEM

CROSS REFERENCE TO RELATED APPLICATION(S)

This application claims the benefit of U.S. Provisional Application No. 61/180,841, filed May 23, 2009, which is incorporated herein by reference in its entirety.

BACKGROUND OF THE INVENTION

1. Field of the Invention

The present invention is directed generally to methods of and devices for damaging or destroying a computer hard drive that prevent subsequent retrieval of data from the damaged or destroyed hard drive.

2. Description of the Related Art

Effective data retention and destruction is mandated by a number of regulatory requirements (including, but not limited to, the Gramm-Leach-Bliley Act ("GLBA") 501 and the Health Insurance Portability and Accountability Act ("HIPAA")), industry best practices, and expectations (and desires) of consumers with respect to their individual privacy. Various commercially available methods and devices intended to address these requirements offer only varying degrees of effectiveness. These methods include software based methods (e.g., using operating system commands or secure file deletion software to delete data), electromagnetic methods (e.g., degaussing), and mechanical methods (e.g., crushing, or drilling).

With respect to software based methods, using conventional operating system commands to delete files from a hard drive is not an effective way to remove data from the hard drive because most operating systems do not actually delete bit patterns physically stored on the drive. Instead, most operating systems simply remove a file system pointer to the data. After this pointer has been removed from the file system, the drive sectors storing the data are available for reuse by other files. When a drive sector is reused, the data previously stored in the drive sector is overwritten with new data. However, many operating systems leave behind "ghost pointers" that may be used (by file recovery or un-deletion software) to retrieve data the user thought was permanently deleted. Even if "ghost pointers" are not available, there is no guarantee that the drive sector containing the data will be reused. Further, even if the drive sector containing the data is reused, the magnetic alignments of bits (written by the drive's write head) do not necessarily guarantee the magnetic fields of all electrons are aligned in the same direction as others representing the same bit of data. Therefore, equipment capable of reading magnetic fields on the drive platters in sufficient detail may be used to recover enough of the original bits, which (when used in combination with statistical reconstruction algorithms) may be used to reconstruct a reduced resolution version of the original data stream.

Secure file deletion software is not completely effective for the same reasons described above. Some secure file deletion software attempts to make data recovery impossible by repeatedly overwriting the data stored on a hard drive. While statistical reconstruction after multiple random and patterned overwrites is more involved and less reliable than a reconstruction created after a single overwrite by another file, such statistical reconstruction remains within the realm of theoretical possibility.

Electromagnetic methods have also proven ineffective. Drive degaussing is not completely effective for the same reasons secure deletion software is not completely effective. As a matter of fact, the high intensity magnetic field aligns most of the magnetic fields on the drive platters in a single direction but may not align all magnetic fields on the drive platters in that direction. Magnetic fields that are not realigned could allow the statistical reconstruction described above to be performed. However, degaussing does have the added advantage of potentially damaging the electronics of the hard drive thereby rendering the hard drive inoperable. Conversely, this could be considered a disadvantage because to determine whether the degaussing operation was effective, one would have to attach undamaged electronics to the drive platters. Nevertheless, such damage does not prevent removal of the drive platters, which may be examined independently as described above. In addition, newer hard drives have greatly improved magnetic shielding designed to protect from interference during normal operation which reduces the overall effectiveness of degaussing.

Many conventionally used mechanical methods, such as drive crushing or drilling, are also not completely effective. While the process generally renders the drive inoperable (e.g., prevents the drive platters from spinning within the original drive assembly), the drive platters, which still contain an overwhelming majority of the original data, may be removed from the original drive assembly. Much of the original data can be retrieved from the drive platters by a device capable of high resolution analysis of the magnetic properties of the drive platters.

Services offering hard drive destruction that reduce the hard drive to small particles do exist; however, they are inconsistent in the size of the particles produced from the hard drive. Many of the particles produced are large enough that individual analysis of the magnetic fields on the fragments is still possible (similar to reconstructing a shredded paper document). In addition, many of the services of this nature require specialized equipment. In some case, the specialized equipment is moved to the location of the hard drive, which can be expensive. Alternatively, end of life hard drives may be shipped to the specialized equipment (e.g., at a central location), which requires the owner of the hard drive to relinquish control of the hard drive to a third party for transport. Obviously, this is not without some risks that the hard drive will be misappropriated or lost during transport.

Therefore, a need exists for methods of destroying a hard drive that ensure data stored on the hard drive cannot be retrieved that also allows the owner of the hard drive to maintain possession and/or control of the hard drive at all times. A portable device configured to destroy a hard drive such that its data could not be recovered is also desirable. It would be beneficial if such a device could be configured to operate in a conventional office, mobile, and/or retail environments (e.g., be powered by a standard electrical service, operated quietly, operated safely, and the like). The present application provides these and other advantages as will be apparent from the following detailed description and accompanying figures.

SUMMARY OF THE INVENTION

Aspects of the invention include a system for destroying a memory device (such as a hard drive) having data stored thereon. The system includes a rotatable grind wheel positioned inside a grind chamber. The grind wheel is selectively rotated by a motor connected to the grind wheel. A device controller may be configured to instruct the motor when to rotate the grind wheel and when not to rotate the grind wheel.

A pressure arm presses the memory device against the grind wheel as the grind wheel rotates and grinds the memory device into particles from which the data stored on the memory device cannot be recovered. The pressure arm is moveable between an upper position and a lower position.

A hydraulic pump may be connected to the pressure arm and configured to selectively position the pressure arm in the upper position to engage an upper portion of the memory device and selectively lower the pressure arm toward the lower position causing the pressure arm to bear against the upper portion of the memory device and press the memory device against the grind wheel as the grind wheel rotates. The hydraulic pump may also be configured to raise the pressure arm to the upper position from the lower position after a substantial portion of the memory device has been ground into particles.

The system may include a plurality of guides configured to maintain the memory device in a substantially stationary position relative to the pressure arm as the grind wheel rotates.

The particles ground from the memory device are received inside a receptacle positioned adjacent to the grind wheel.

Optionally, the system may also include a camera operable to capture an image of the memory device before the memory device is ground into the particles. The device controller may be configured to instruct the camera to capture the image of the memory device.

Other aspects of the invention include a method of destroying a memory device having data stored thereon. The method includes positioning the memory device on a rotatable grind surface inside a grind chamber, rotating the grind surface with the memory device positioned thereupon, pressing a portion of the memory device against the grind surface as the grind surface rotates to reduce the portion pressed against the grind surface to particles from which the data stored on the memory device cannot be recovered, and collecting the particles in a receptacle. The method may include inserting the memory device into the grind chamber through a slot formed therein.

In some embodiments, the method includes positioning a pressure arm adjacent an upper surface of the memory device, and applying a force to the upper surface of the memory device with the pressure arm. The force is directed toward the grind surface. The application of force continues after the grind surface has begun rotating to thereby press the portion of the memory device against the grind surface as it rotates.

Optionally, the method may also include photographing the memory device to capture a photograph of the memory device before rotating the grind surface, and storing the photograph on an external memory or external computing device. Further, before the memory device is photographed, the memory device may be tilted relative to a camera operable to photograph the memory device. After the photograph is taken, the tilted memory device may be repositioned in an upright position.

The method may include positioning a forwardly facing side of the memory device adjacent to a front guide, positioning at least one rear guide portion against a rearwardly facing side of the memory device (the rearwardly facing side of the memory device being opposite the forwardly facing side of the memory device), positioning a first guide portion against a first side of the memory device; and positioning a second guide portion against a second side of the memory device (the first side of the memory device being opposite the second side of the memory device). In particular embodiments, the front guide includes a pivot member. In such embodiments, the method may further include pivoting the pivot member toward the memory device to tip the memory device rearwardly before the rear guide portion is positioned against the rearwardly facing side of the memory device and before the memory device is photographed. Then, after the memory device is photographed, the rear guide portion is pressed against the rearwardly facing side of the memory device to return the tipped memory device to an upright position.

Another aspect of the present invention includes a portable system for destroying a memory device storing data. The system includes a rotatable grind wheel, means for pressing the memory device against the grind wheel as the grind wheel rotates to grind away a portion of the memory device to form particles of ground memory device, and means for retaining the particles of ground memory device inside the system. Optionally, the system may also include means for maintaining the memory device in a substantially stationary position as the grind wheel rotates.

Other aspects of the invention include a method that places a memory device in a grind chamber without first disassembling the memory device; and rotates a grind wheel positioned inside the grind chamber. The grind wheel grinds the memory device into particles from which any data stored on the memory device cannot be recovered. In embodiments in which the memory device is a hard drive, the method may include removing the hard drive from a computing device before placing the hard drive in the grind chamber, and placing the hard drive inside the grind chamber without first disassembling the hard drive.

BRIEF DESCRIPTION OF THE SEVERAL VIEWS OF THE DRAWING(S)

DETAILED DESCRIPTION OF THE INVENTION

Figure 1:
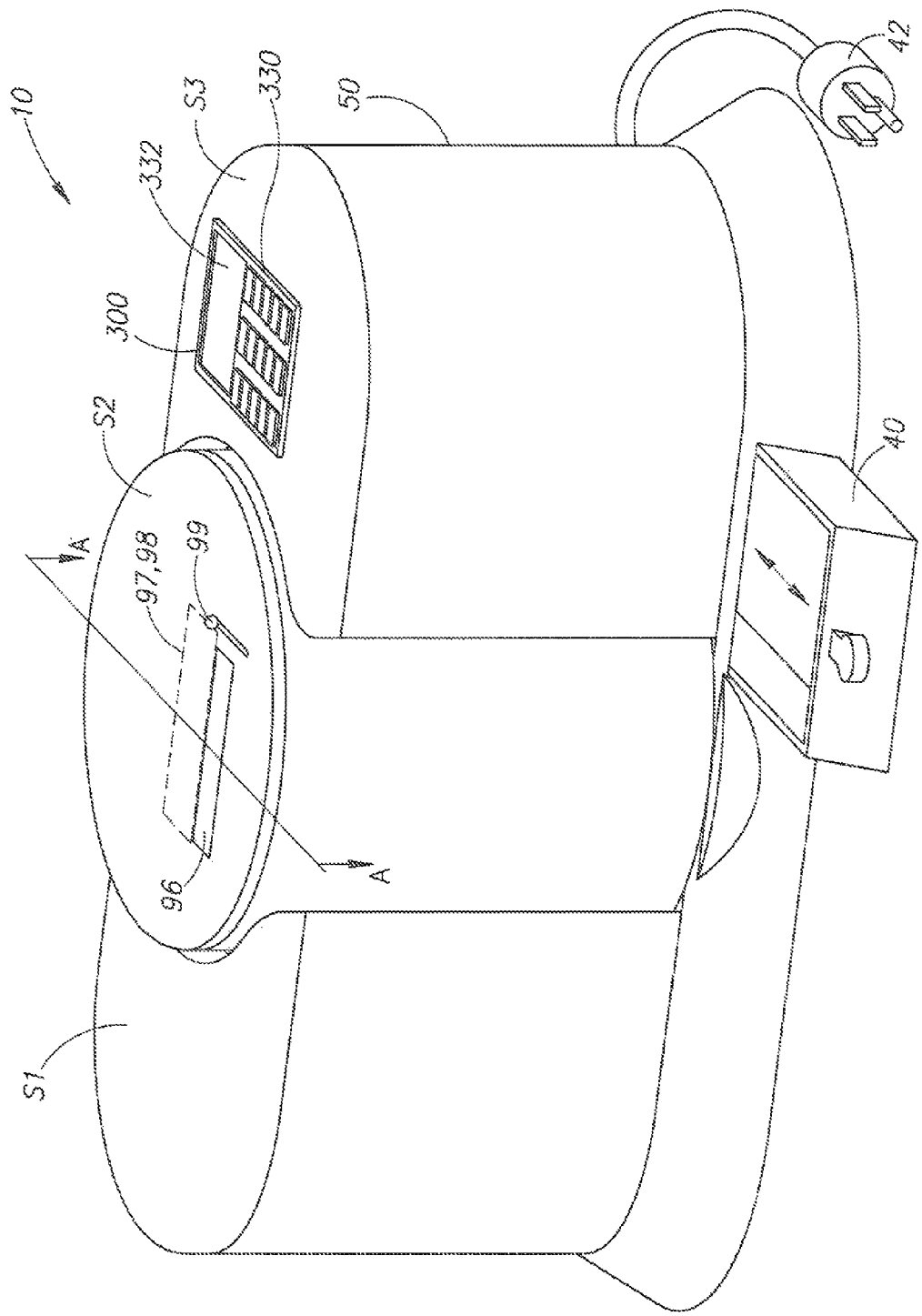
FIG. 1 is a perspective view of a first embodiment of a device configured to grind a hard drive into particles from which data previously stored on the hard drive cannot be recovered.

FIGS. 1-14 illustrate a first embodiment of a device 10 configured to destroy a conventional computer hard drive such that data stored on the hard drive before its destruction cannot be recovered. The device 10 may be configured to be portable. Turning to FIG. 2, the first embodiment of the device 10 is configured to grind a hard drive 20 having a label 22 affixed thereto into drive remnants, debris, or particles 30. The hard drive 20 has an upper surface 24 opposite a lower surface 26 (see FIG. 3). The particles 30 are ground from the lower surface 26 (illustrated FIG. 3) and collected in a receptacle 40. The hard drive 20 may be removed from a computing device (not shown) such as a conventional personal computer, server, and the like, and placed in the device 10. The hard drive 20 need not be disassembled before being processed by the device 10.

For ease of illustration, the hard drive 20 has been illustrated as a standard or conventional computer hard drive 20 of the type used in a conventional personal computer (not shown). However, those of ordinary skill in the art appreciate that the device 10 may be used to grind other data storage media, such as flash memory, handheld electronic devices having onboard memory (e.g., portable music players, such as an IPOD® MP3 player), cellular telephones, smartphones, portable drives, personal data assistants, optical disks, and the like, into the particles 30.

Depending upon the implementation details, the device 10 may be powered by a conventional electrical service line (not shown) provided by a standard power utility. In such embodiments, the device 10 includes a conventional plug 42 configured to be received inside a conventional wall outlet (not shown).

The device 10 includes a housing 50 which may include three sections "S1," "S2," and "S3." The sections "S1," "S2," and "S3" may be of approximately equal size but this is not a requirement. In the embodiment illustrated, the second section "S2" is positioned between the first section "S1" and the third section "S3." However, this is also not a requirement and embodiments in which the sections "S1," "S2," and "S3" are positioned differently relative to one another are within the scope of the present teachings. For ease of illustration, in FIGS. 2-4, the housing 50 has been illustrated as transparent to provide a view of the internal components of the device 10.

The first section "S1" includes a substantially hollow chamber 52 that houses a motor 60 coupled to a rotatable drive shaft 62. The motor 60 is configured to selectively rotate the drive shaft 62 in a direction of rotation (indicated by arrow "R1"). The motor 60 may be implemented as an electrically powered high torque, high speed motor. The motor 60 may be non-rotatably coupled to or otherwise supported by the first section "S1" of the housing 50.

The drive shaft 62 has a proximal end portion 64 opposite a distal end portion 66. The proximal end portion 64 is coupled to the motor 60. A conventional drive gear 70 is coupled to the distal end portion 66 of the drive shaft 62. The drive gear 70 has a plurality of teeth 72 arranged about its circumference. The drive gear 70 is rotated by the drive shaft 62 when the shaft 62 is rotated by the motor 60.

A drive chain 80 is entwined about the drive gear 70 and meshed with the teeth 72. The drive chain 80 includes a plurality of links 82 connected together to form a continuous loop. As the drive gear 70 rotates, the teeth 72 serially engage the links 82 of the drive chain 80 to thereby rotate the drive chain 80.

Figure 4:
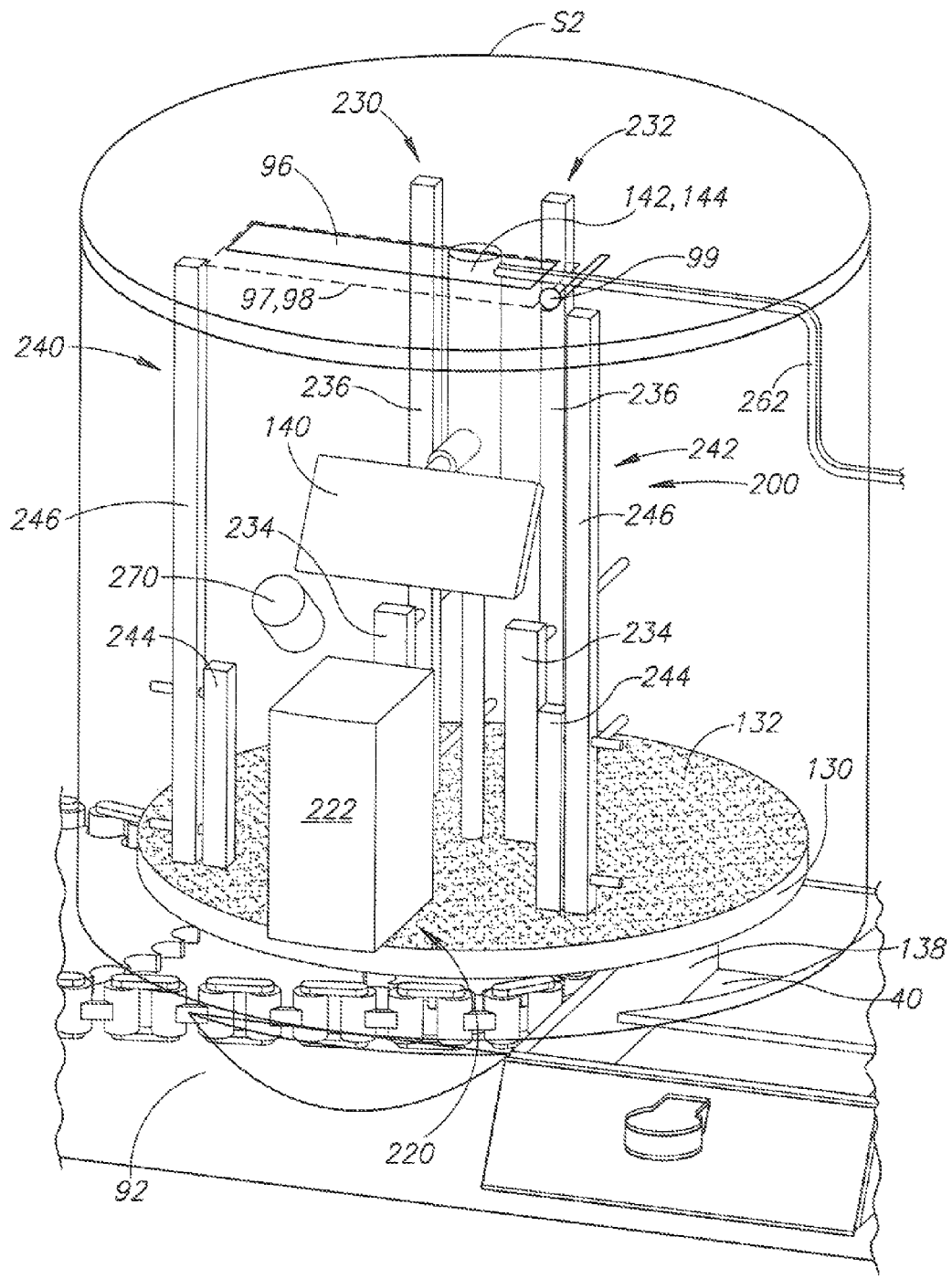
FIG. 4 is an enlarged perspective view of the grind chamber of the device of FIG. 1 illustrated with a transparent housing to provide a view of the internal components of the device.

Turning to FIG. 4, the second section "S2" of the housing 50 defines a substantially hollow grind chamber 90 positioned above a substantially hollow lower chamber 92. While not required, at least a portion of the second section "S2" defining the grind chamber 90 may be constructed from a transparent or semi-transparent material so that a user can observe the hard drive 20 (see FIG. 2) as the device 10 grinds the hard drive 20 into the particles 30.

Figure 7:
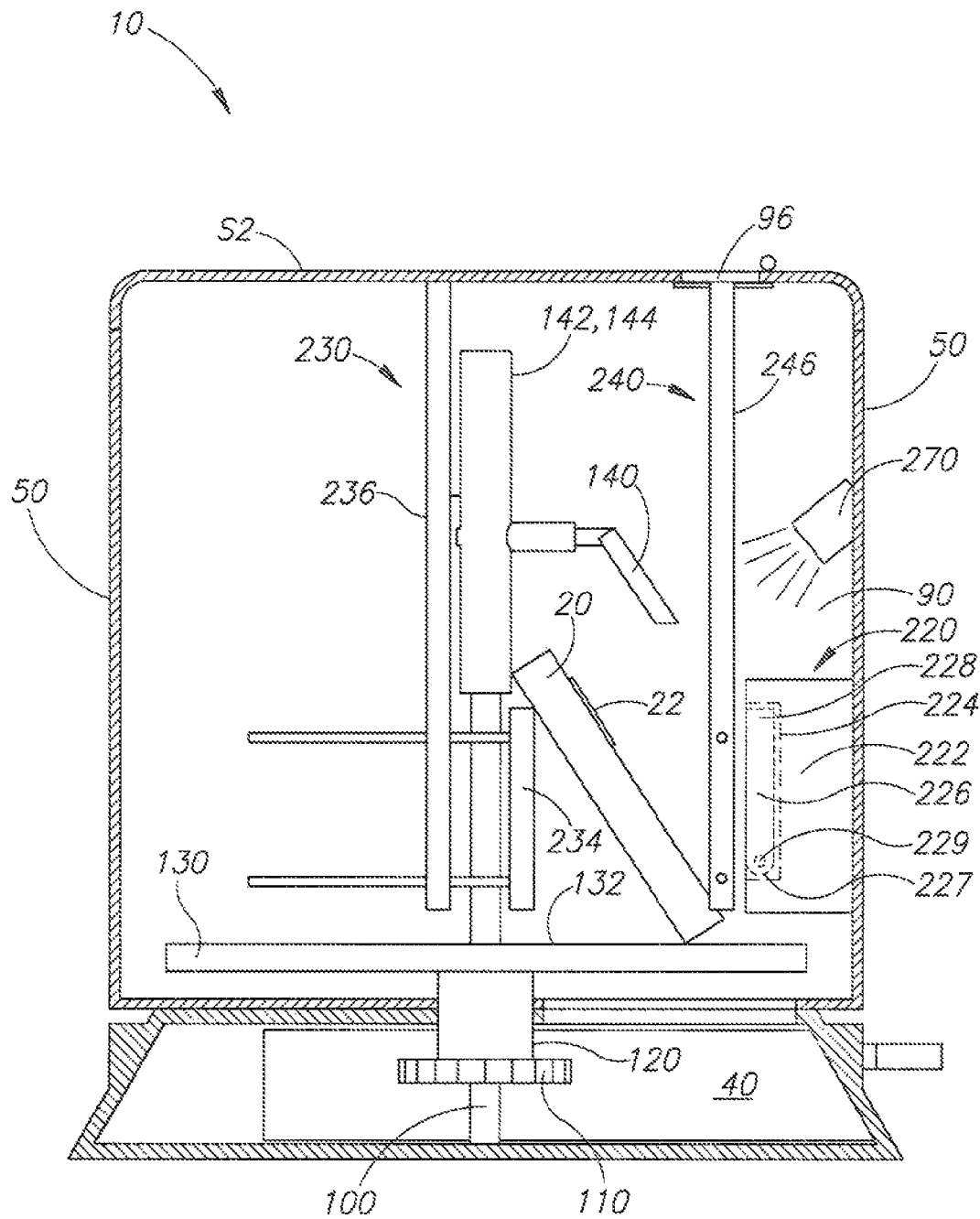
FIG. 7 is a cross section of the device of FIG. 1 taken substantially along line A-A depicting the device performing a third stage of a grind cycle.
Figure 8:
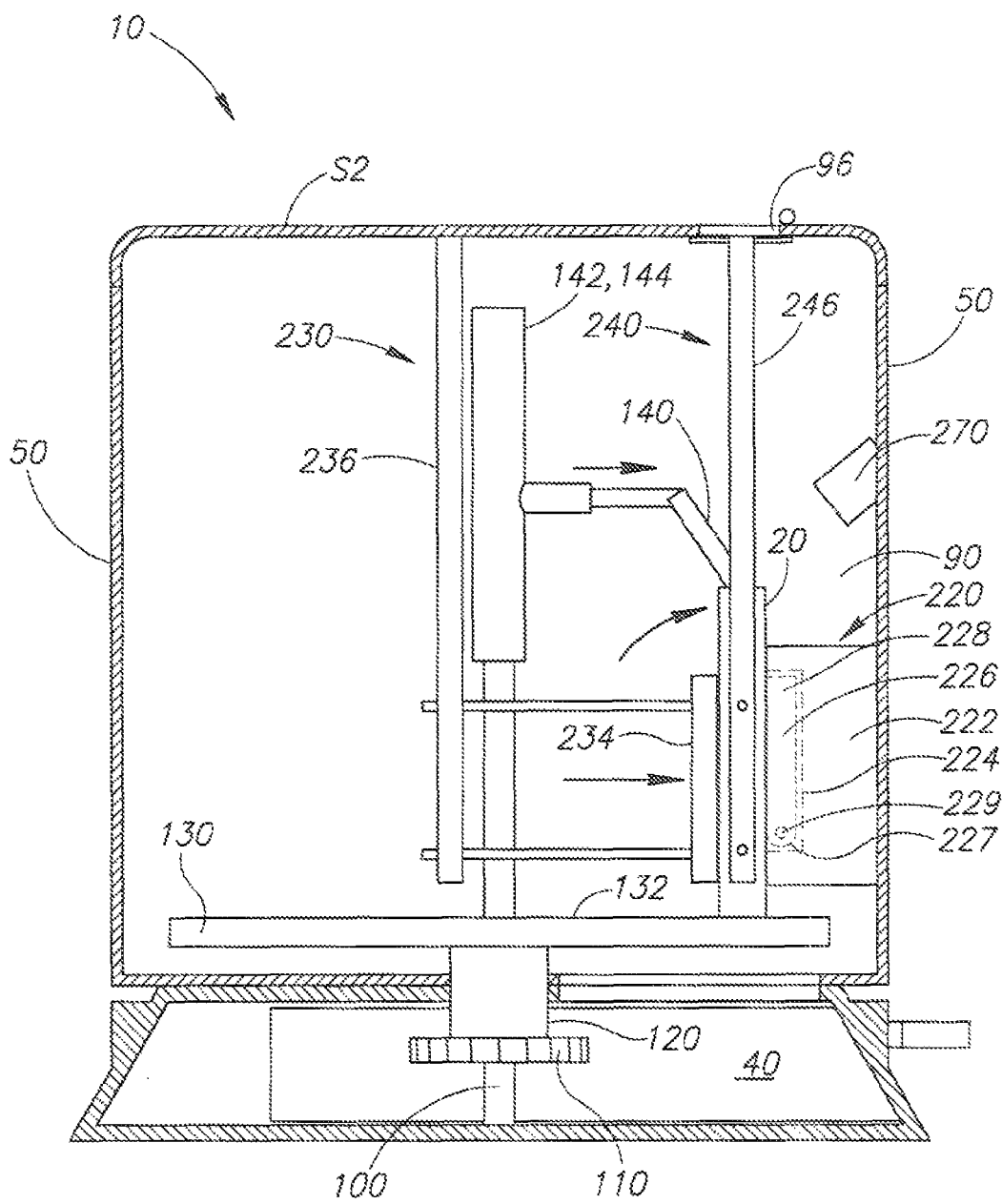
FIG. 8 is a cross section of the device of FIG. 1 taken substantially along line A-A depicting the device performing a fourth stage of a grind cycle.
Figure 9:
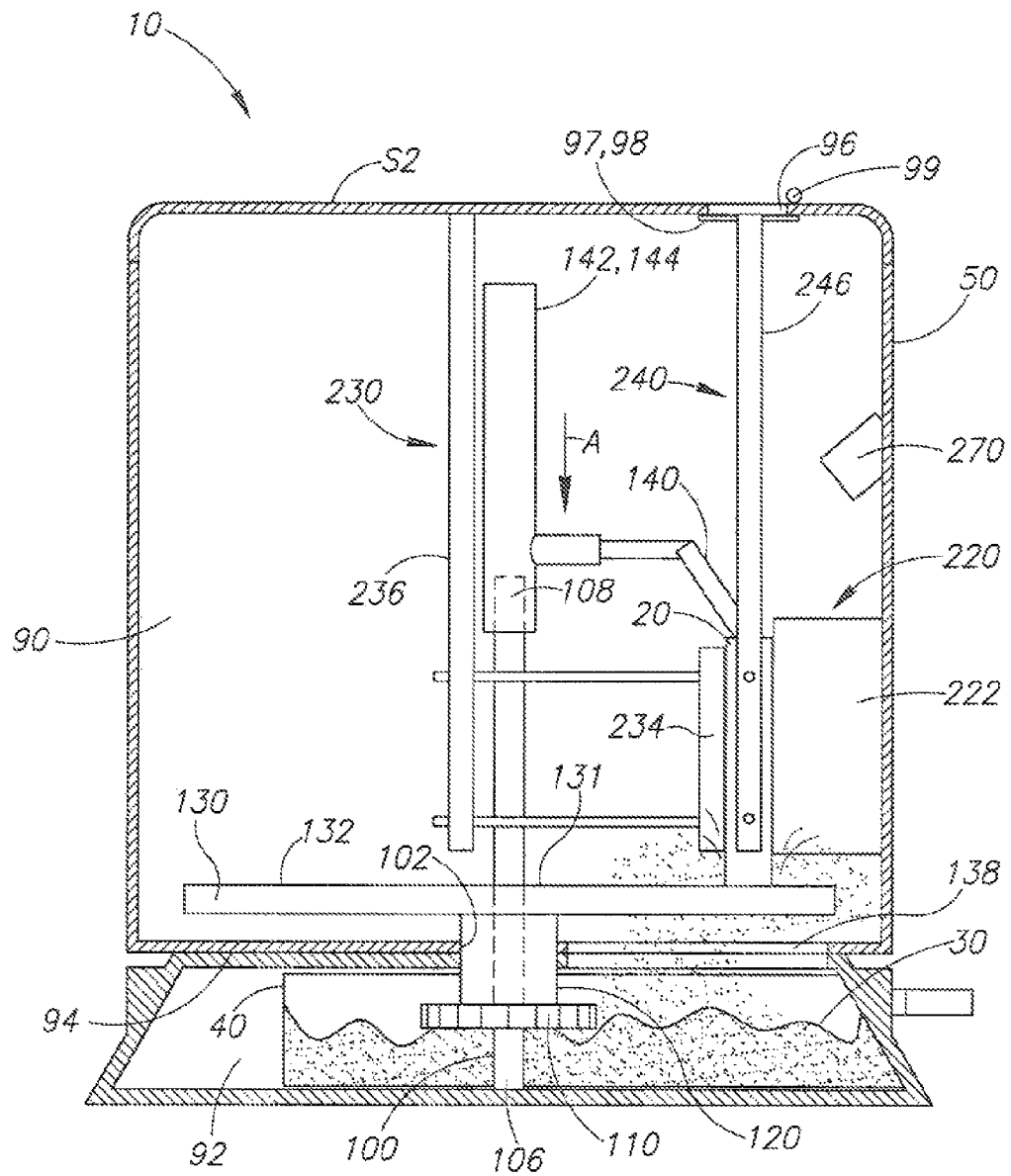
FIG. 9 is a cross section of the device of FIG. 1 taken substantially along line A-A depicting the device performing a sixth stage of a grind cycle.

FIGS. 5-11 illustrate cross sections through the grind chamber 90 during different stages of a grind cycle (including an optional photographing process). For ease of illustration, the drive chain 80 has been omitted from FIGS. 5-11. As illustrated in FIG. 9, the grind chamber 90 is divided from the lower chamber 92 by a dividing wall 94. The dividing wall 94 limits the movement of the particles 30 created in the grind chamber 90 and helps prevent the particles 30 from entering the lower chamber 92 where they could interfere with the drive mechanisms. The lower chamber 92 is in communication with the chamber 52 (see FIG. 2) defined by the first section "S1" (see FIG. 2) of the housing 50 such that the lower chamber 92 and the chamber 52 may be characterized as a single continuous chamber.

Figure 5:
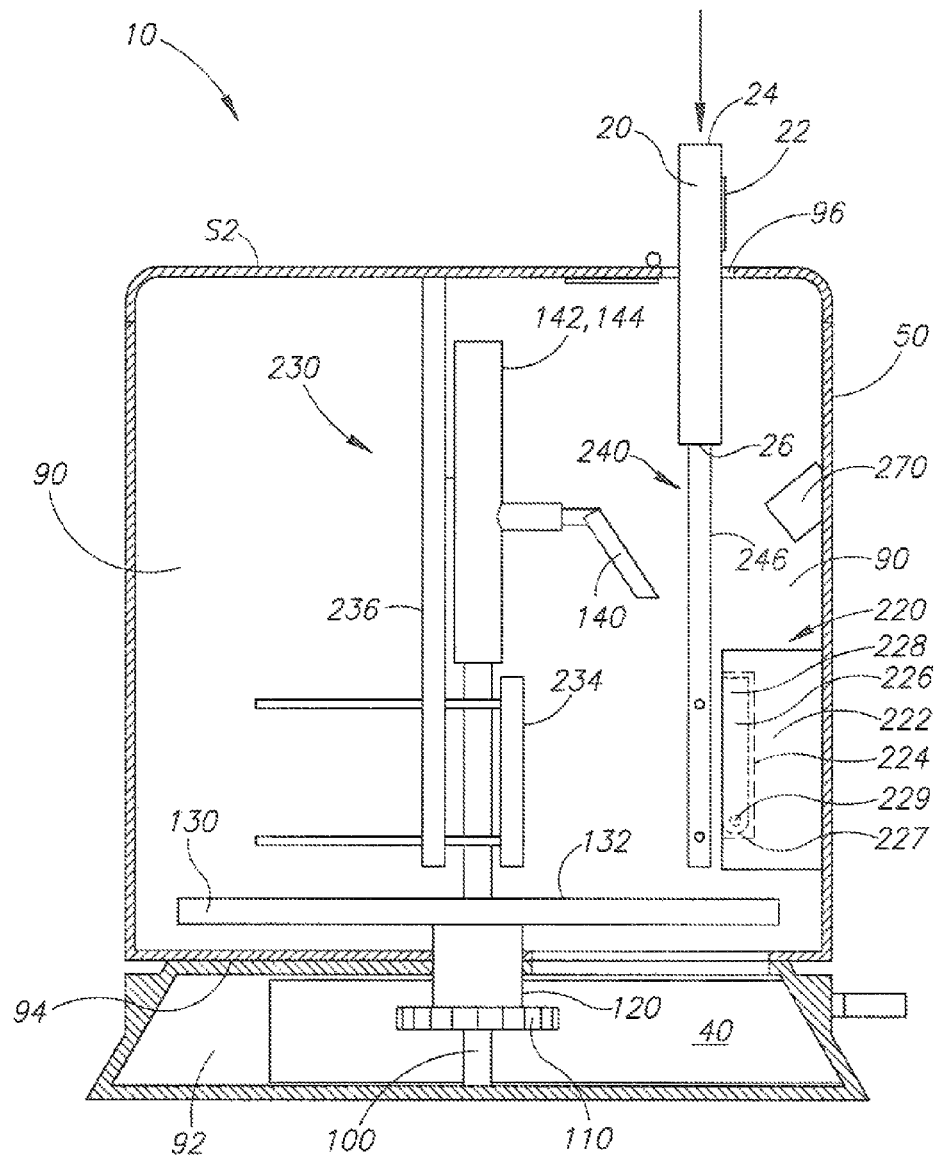
FIG. 5 is a cross section of the device of FIG. 1 taken substantially along line A-A depicting the device performing a first stage of a grind cycle.

Turning to FIG. 5, an aperture or slot 96 is formed in the second section "S2." The slot 96 is in communication with the grind chamber 90 and configured to allow the hard drive 20 to pass therethrough into the grind chamber 90 thus, providing an inlet into the grind chamber 90 for the hard drive 20.

Turning to FIG. 9, the device 10 may include a closure 97 configured to cover the slot 96 and prevent the particles 30 from exiting the grind chamber 90 through the slot 96. In the drawings, the closure 97 is illustrated as a sliding cover 98 positionable by a conventional slider mechanism 99. The slider mechanism 99 may be slid to and fro by a user to selectively open and close the slot 96. The slider mechanism 99 moves the cover 98 to open the slot 96 so that the hard drive 20 may be inserted into the grind chamber 90 and moves the cover 98 to close the slot 96 to help prevent the escape of the particles 30 (created by the grind wheel 130) from the grind chamber 90.

Alternatively, the closure 97 may be implemented as another type of cover, door, or lid couplable to a portion of the second section "S2" of the housing 50 adjacent the slot 96. Depending upon the implementation details, the closure 97 may be hingedly attached or slidably attached to the housing 50. The closure 97 may form an air-tight seal with the portion of the second section "S2" of the housing 50 defining the slot 96. Optionally, the closure 97 may be lockable to the second section "S2" of the housing 50 when the device 10 is grinding the hard drive 20. The device 10 is not limited to use with any particle implementation of the closure 97.

A non-rotatable shaft 100 extends upwardly from the lower chamber 92 through an aperture 102 formed in the dividing wall 94 and at least partially into the grind chamber 90. The shaft 100 has a first end portion 106 opposite a second end portion 108. The first end portion 106 is non-rotatably coupled or anchored to the housing 50 inside the lower chamber 92. Thus, the shaft 100 is supported upon a lower portion of the second section "S2" of the housing 50.

Figure 12:
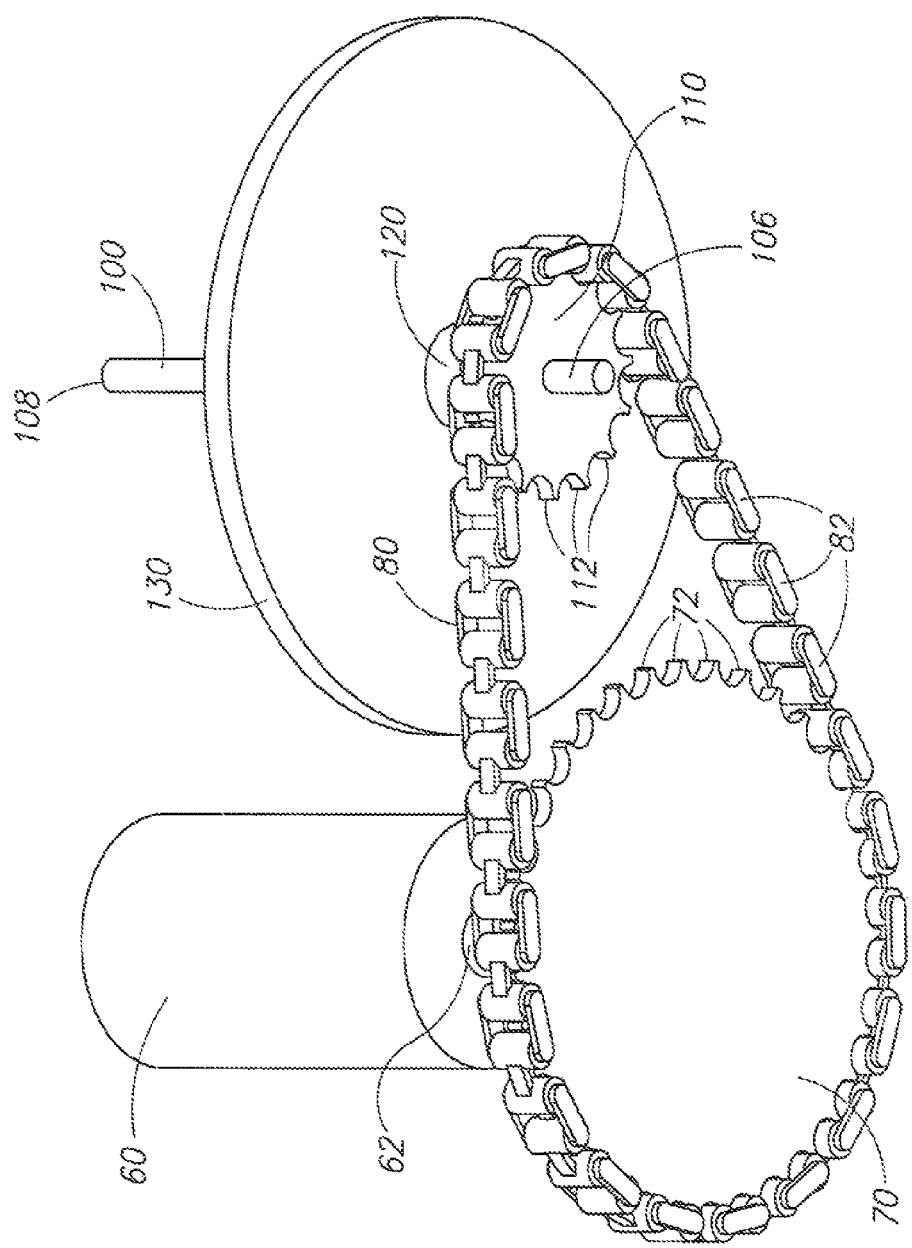
FIG. 12 is a perspective view of an underside of a motor, a drive shaft, a drive gear, a driven gear, a drive chain, and a grind wheel of the device of FIG. 1.
Figure 13:
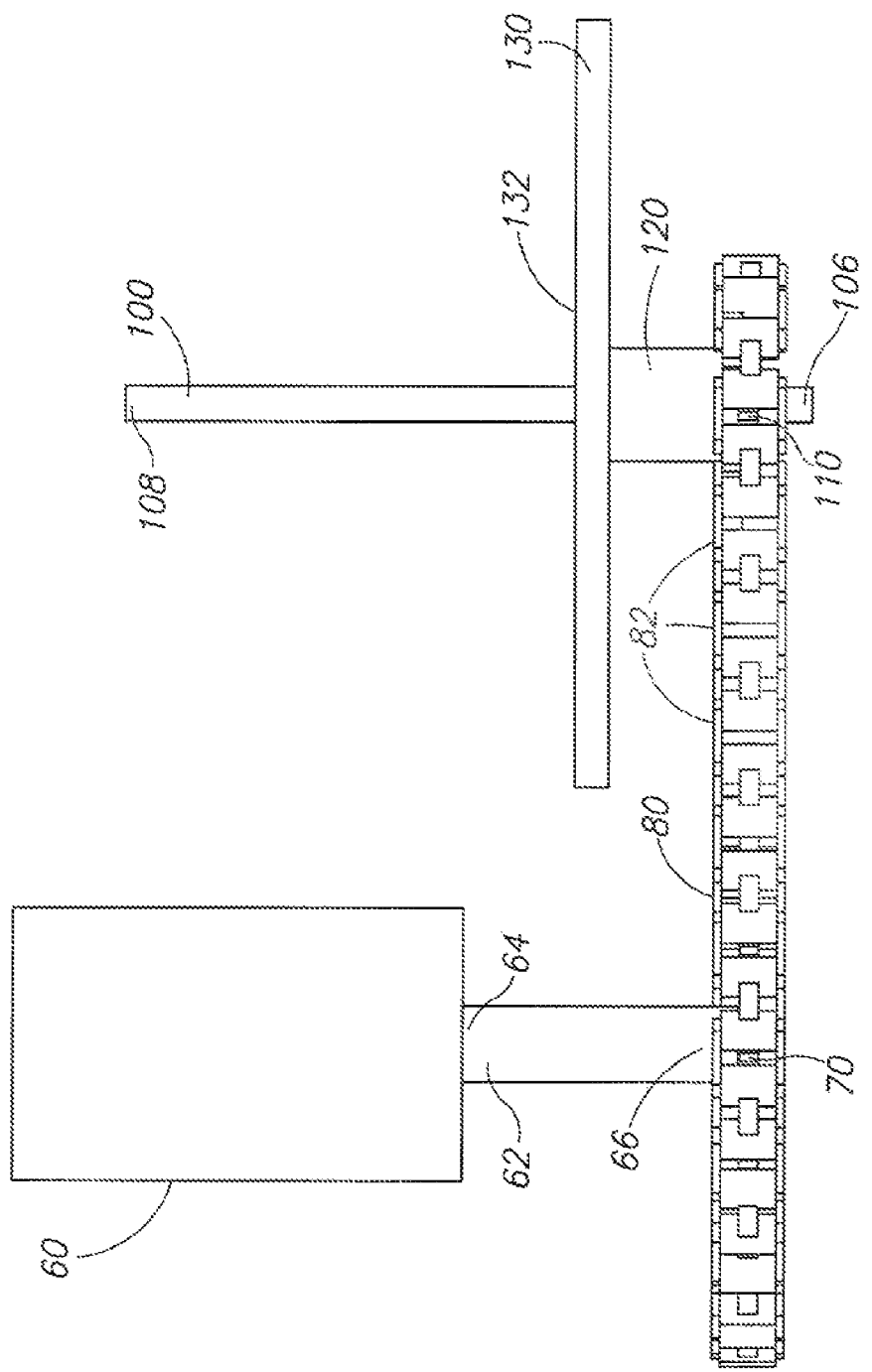
FIG. 13 is a side view of the motor, the drive shaft, the drive gear, the driven gear, the drive chain, and the grind wheel depicted in FIG. 12.

A driven gear 110 is positioned on the shaft 100 within the lower chamber 92. Turning to FIG. 12, the driven gear 110 has a plurality of teeth 112 arranged about its circumference. The drive chain 80 is entwined about the driven gear 110 and meshed with the teeth 112. As the drive chain 80 rotates, the teeth 112 serially engage the links 82 of the drive chain 80 thereby rotating the driven gear 110 about the shaft 100. Thus, the driven gear 110 is rotated about the shaft 100 by the drive chain 80. Bearings (not shown) may be positioned between the inside of the driven gear 110 and the shaft 100.

Returning to FIG. 9, the driven gear 110 is non-rotatably coupled to a collar 120 disposed about a portion of the shaft 100 that extends from the lower chamber 92 into the grind chamber 90 through the aperture 102 formed in the dividing wall 94. The collar 120 is rotated about the shaft 100 by the driven gear 110. Bearings (not shown) may be positioned between the inside of the collar 120 and the shaft 100. Bearings (not shown) may also be positioned between the outside of the collar 120 and the inside of the aperture 102 formed in the dividing wall 94.

A grind wheel 130 is non-rotatably coupled to the collar 120 inside the grind chamber 90. The shaft 100 extends through a center portion 131 of the grind wheel 100 and the grind wheel is rotatable about the shaft 100. As the collar 120 is rotated about the shaft 100 by the driven gear 110, the grind wheel 130 rotates with the collar 120 about the shaft 100. Bearings (not shown) may be positioned between the inside of the grind wheel 130 and the shaft 100. Thus, the shaft 100 defines an upright axis of rotation about which the driven gear 110, the collar 120, and the grind wheel 130 rotate.

The grind wheel 130 may be implemented as a round low grit grinding wheel that is deformation resistant to the material used to construct commercially available hard drives. The grind wheel 130 has a grinding surface 132 sized such that, while the grind wheel 130 is spinning, the grinding surface 132 will contact the entire lower surface 26 of the hard drive 20.

Returning to FIG. 2, the grind wheel 130 rotates about the shaft 100 in a direction of rotation (indicated by arrow "R2"). Thus, in the embodiment illustrated, the grind wheel 130 is rotated by a rotational force imparted on the center portion 131 (see FIG. 9) of the grind wheel 130 by the drive chain 80. The housing 50 includes a gap or aperture 138 (illustrated in FIG. 2) positioned between the second and third sections "S2" and "S3" through which the particles 30 exit the grind chamber 90 and enter the receptacle 40. As the grind wheel 130 rotates in the direction of rotation indicated by the arrow "R2," the grind wheel 130 deposits the particles 30 in the receptacle 40 through the aperture 138.

Referring to FIG. 9, a pressure arm 140 is connected to the second end portion 108 of the shaft 100. The pressure arm 140 is movable between a disengaged position (illustrated in FIGS. 3-7 and 11) and an engaged position (illustrated in FIGS. 2 and 8-10). In the disengaged position, the pressure arm 140 is either spaced apart from the hard drive 20 or (when the hard drive 20 is not in the grind chamber 90) a position in grind chamber 90 that the hard drive 20 will occupy when it is inserted into the grind chamber 90 through the slot 96. Thus, when the pressure arm 140 is in the disengaged position, the pressure arm 140 is spaced apart from the hard drive 20 and avoids contact therewith. In this manner and as illustrated in FIG. 5, the pressure arm 140 does not interfere with the hard drive 20 as it is inserted into the grind chamber 90 through the slot 96. In the engaged position, the pressure arm 140 is positioned to contact the upper surface 24 of the hard drive 20.

Figure 10:
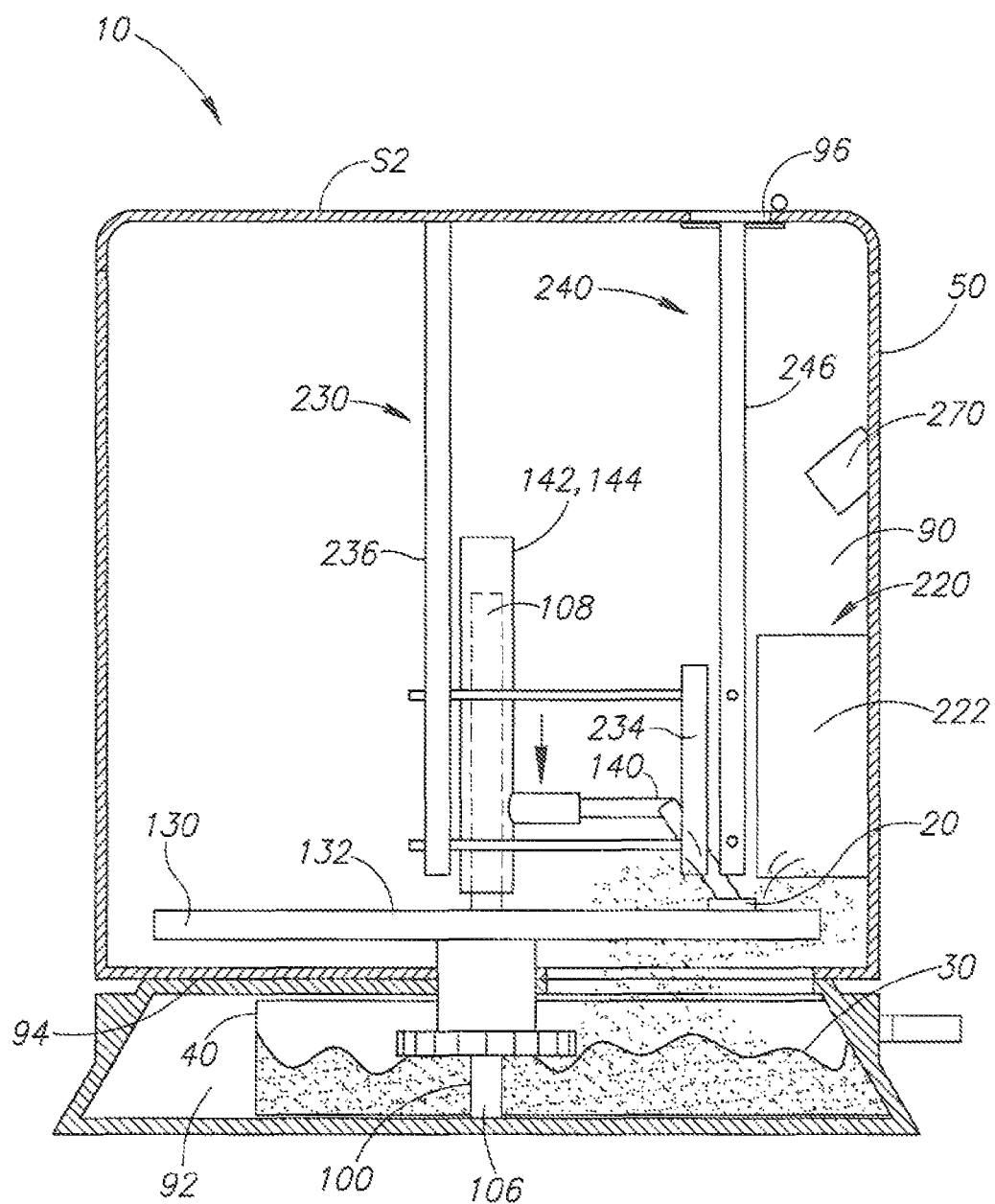
FIG. 10 is a cross section of the device of FIG. 1 taken substantially along line A-A depicting the device performing a seventh stage of a grind cycle.

Returning to FIG. 9, in the first embodiment, the pressure arm 140 is movable laterally relative to the shaft 100 to selectively position the pressure arm 140 in the disengaged position (illustrated in FIGS. 3-7 and 11) and the engaged position (illustrated in FIGS. 2 and 8-10). By way of a non-limiting example, the pressure arm 140 may be moved laterally by a linear drive mechanism (not shown). By way of non-limited examples, the linear drive mechanism may be constructed using a solenoid drive, a comb drive, a gear drive, a hydraulic cylinder or piston, and the like. Any suitable mechanism known in the art may be used to move the pressure arm 140 laterally to selectively position the pressure arm in the disengaged and engaged positions.

The pressure arm 140 is also movable longitudinally relative to the shaft 100 between a first longitudinal position (illustrated in FIGS. 2-8 and 11) and a second longitudinal position (illustrated in FIG. 10). The pressure arm 140 is illustrated traveling between the first and second longitudinal positions in FIG. 9. In the embodiment illustrated, the pressure arm 140 is mounted on a linear drive mechanism 142 (illustrated as a hydraulic piston 144) that positions the pressure arm 140 longitudinally relative to the shaft 100. When the pressure arm 140 is in the first longitudinal position (illustrated in FIGS. 2-8 and 11), the pressure arm 140 is farthest from the grind surface 132 of the grind wheel 130. When the pressure arm 140 is in the second longitudinal position (illustrated in FIG. 10), the pressure arm 140 is closest to, but does not contact, the grind surface 132 of the grind wheel 130.

Optionally, the device 10 may include a retractable platform (not shown) positioned opposite the slot 96 and above the grind wheel 130. Before the hard drive 20 is inserted into the grind chamber 90, the platform is extended. When the hard drive 20 is inserted into the slot 96, it rests on the extended platform. Then, the device 10 begins rotating the grind wheel 130. After the grind wheel 130 is rotating at full speed, the platform may be retracted from under the hard drive causing the hard drive to fall off the end of the platform and into contact with the grind surface 132 of the grind wheel.

In embodiments that do not include the optional retractable platform, when the hard drive 20 is inserted into the slot 96, it rests on the grind surface 132 of the grind wheel 130. Then, the device 10 begins rotating the grind wheel 130.

The first longitudinal position of the pressure arm 140 is adjacent to or above the upper surface 24 of the hard drive 20 when the lower surface 26 of the hard drive 20 is in contact with the grind surface 132 of the grind wheel 130. Thus, if the first longitudinal position of the pressure arm 140 is above the upper surface 24 of the hard drive 20, it may be necessary to lower the pressure arm 140 into contact with the upper surface 24 of the hard drive 20 before the grind wheel 130 begins rotating. As the grind wheel 130 rotates, it grinds away the lower surface 26 of the hard drive 20. The drive mechanism 142 moves the pressure arm 140 longitudinally toward the grind wheel 130 (and the second longitudinal position) pressing the lower surface 26 of the hard drive 20 against the grind surface 132 as the grind wheel 130 rotates.

The second longitudinal position of the pressure arm 140 is near the grind surface 132 but spaced apart therefrom to avoid damaging the pressure arm 140. When the device 10 stops rotating the grind wheel 130, the pressure arm 140 returns to the first longitudinal position and optionally, to the disengaged position (e.g., see FIG. 11).

Any suitable mechanism known in the art may be used to position the pressure arm 140 longitudinally relative to the shaft 100. By way of non-limited examples, the linear drive mechanism 142 may be constructed using a solenoid drive, a comb drive, a gear drive, a hydraulic cylinder or piston, and the like.

Figure 14:
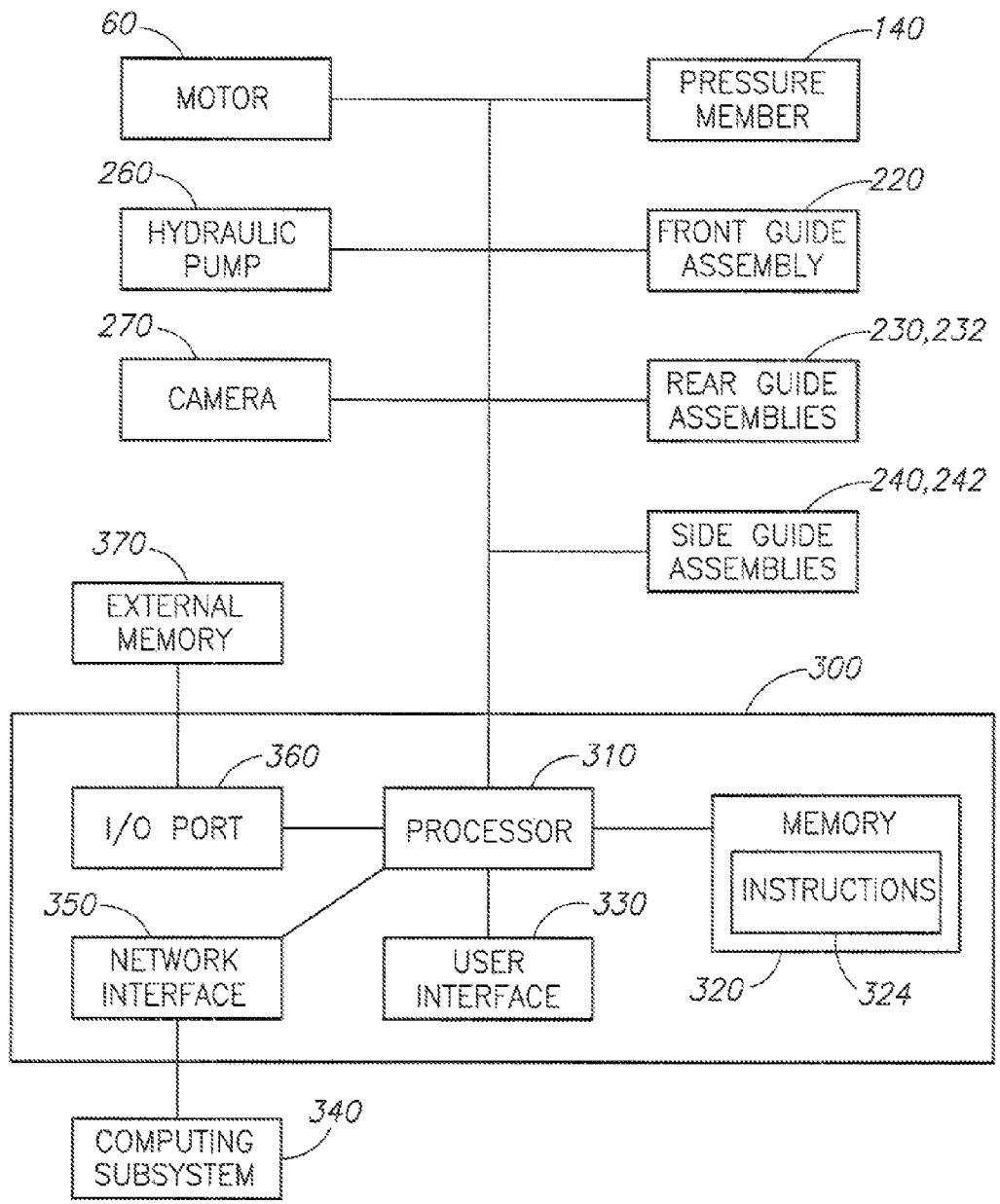
FIG. 14 is a schematic illustrating components of a device controller of the device of FIG. 1.
Figure 15:
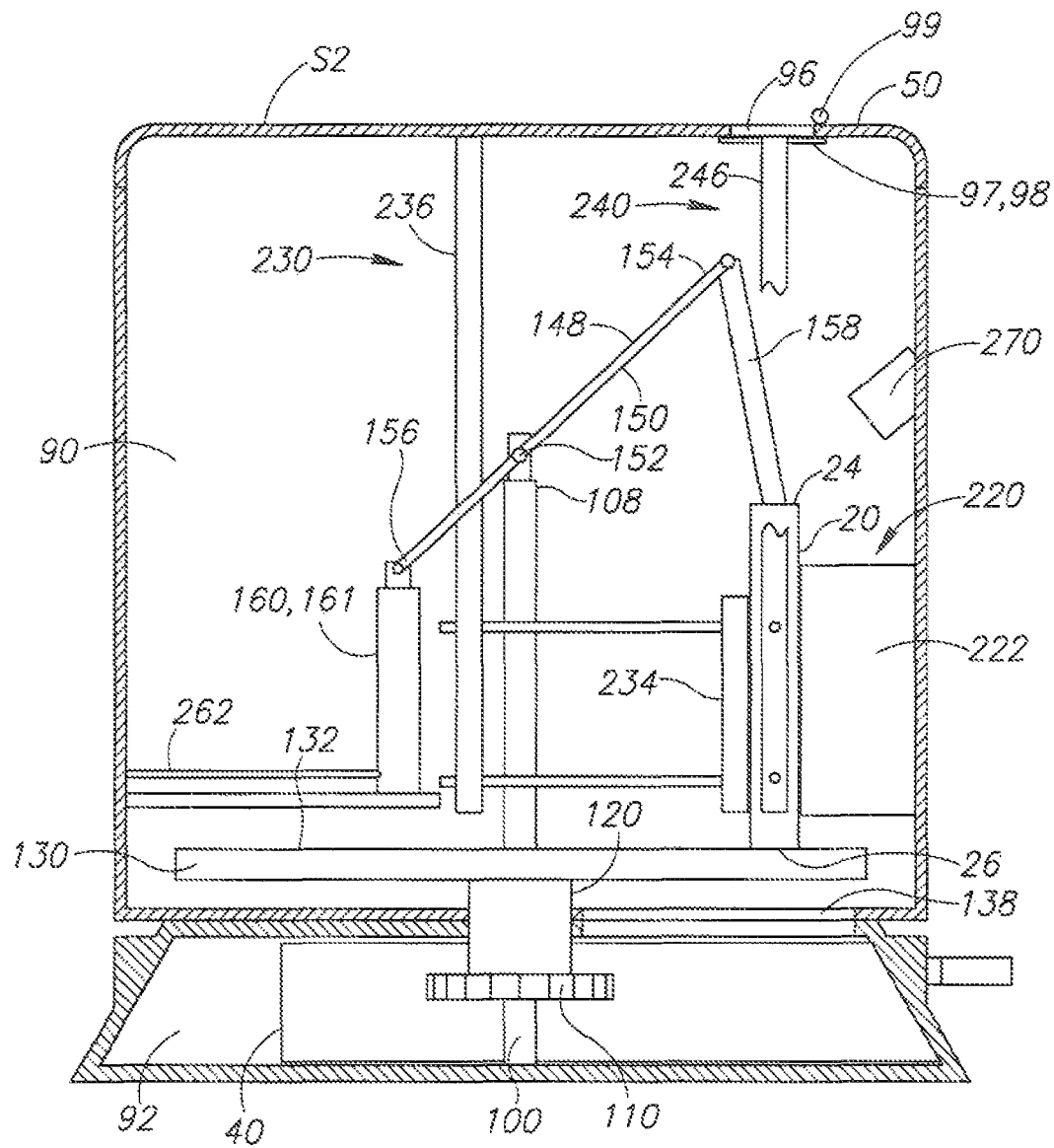
FIG. 15 is a cross-sectional view of a second embodiment of the device having a pivoting pressure arm illustrated in an engaged position.
Figure 16:
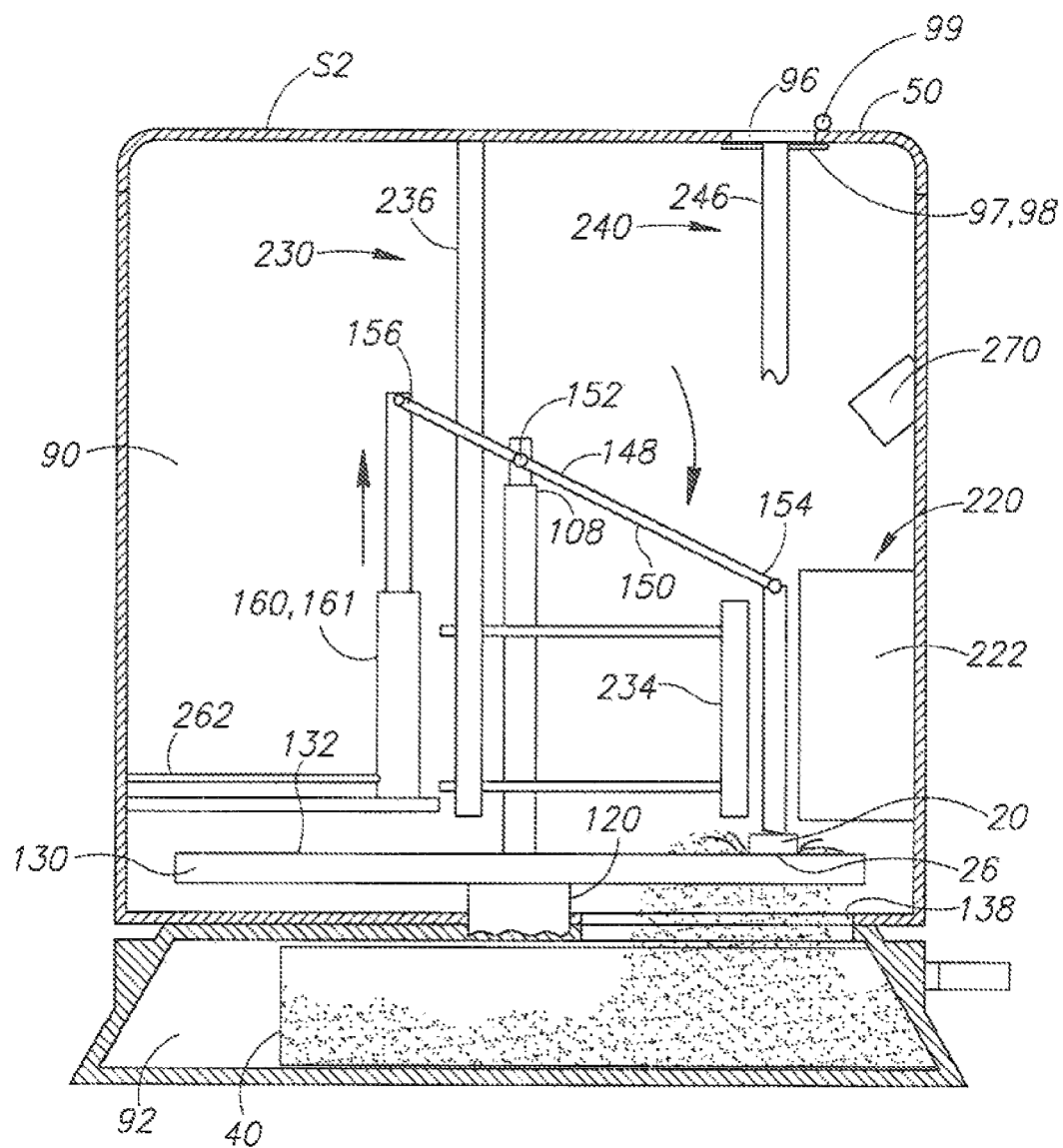
FIG. 16 is a cross-sectional view of the device of FIG. 15 with the pivoting pressure arm illustrated in a second longitudinal position.

FIGS. 15 and 16 depict a second embodiment of the device 10. Like reference numerals have been used to identify like components in FIGS. 1-16. In the second embodiment illustrated in FIGS. 15 and 16, a pressure arm 148 pivots relative to the shaft 100 to selectively position the pressure arm 148 in the disengaged position (not illustrated) and the engaged position (illustrated in FIG. 15) as well as in the first longitudinal position (not illustrated) and the second longitudinal position (illustrated in FIG. 16). In this embodiment, the pressure arm 148 includes a lever 150 pivotably connected to the second end portion 108 of the shaft 100 by a pivot pin 152. The lever 150 has a first end portion 154 opposite a second end portion 156.

An engagement member 158 is pivotably connected to the first end portion 154. The second end portion 156 is pivotably connected to a linear drive mechanism 160 (illustrated as a hydraulic piston). The pressure arm 148 is selectively pivoted into the disengaged position, the first longitudinal position, the engaged position, and the second longitudinal position by a drive mechanism 160 (illustrated as a hydraulic piston 161). Any suitable mechanism known in the art may be used to pivot the pressure arm 148 to selectively position the pressure arm. By way of non-limited examples, the linear drive mechanism may be constructed using a solenoid drive, a comb drive, a gear drive, a hydraulic cylinder or piston, and the like.

Before the hard drive 20 is inserted into the grind chamber 90, the pressure arm 148 is in the disengaged and first longitudinal positions. After the hard drive 20 is inserted into the grind chamber 90 (e.g., via the slot 96), the pressure arm is moved into the engagement position (illustrated in FIG. 15). When the pressure arm 148 is positioned in the engaged position, the engagement member 158 is positioned on the upper surface 24 of the hard drive 20. Then, the drive mechanism 160 pivots the lever 150 toward the hard drive 20 thereby causing the engagement member 158 to apply force to the upper surface 24 of the hard drive 20 pressing the lower surface 26 of the hard drive 20 into the grind surface 132 of the grind wheel 130. The drive mechanism 160 continues pivoting the lever 150 until the pressure arm 148 is positioned in the second longitudinal position (illustrated in FIG. 16). Then, the drive mechanism 160 returns the pressure arm 148 to the disengaged and first longitudinal positions.

Returning to FIG. 2, the device 10 also includes a plurality of guides 200 positioned inside the grinding chamber 90 and configured to maintain the hard drive 20 in a substantially stationary position relative to the grind surface 132 as the grind wheel 130 rotates and grinds away the portion of the hard drive 20 in contact with the grind surface 132. The guides 200 also maintain the hard drive 20 in a substantially stationary position relative to the pressure arm 140. In particular embodiments, the guides 200 are configured to tip or lean the hard drive so that an image of its label 22 may be captured by a digital camera 270 and after the image of the label 22 has been captured (i.e., the hard drive has been photographed), tip the hard drive 20 upright.

Turning to FIG. 4, the guides 200 include a front guide assembly 220, a first rear guide assembly 230, a second rear guide assembly 232, a first side guide assembly 240, and a second side guide assembly 242.

Figure 6:
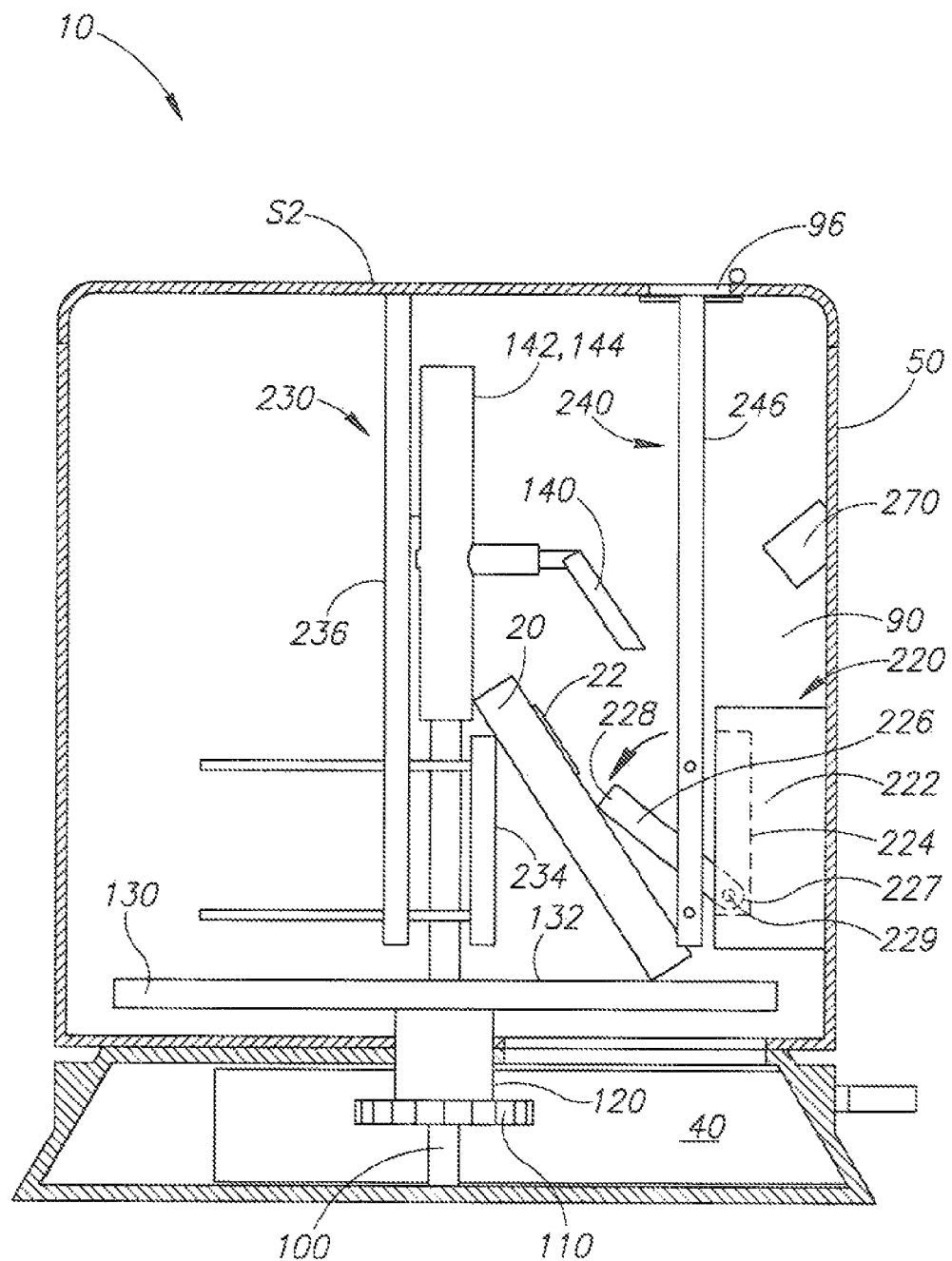
FIG. 6 is a cross section of the device of FIG. 1 taken substantially along line A-A depicting the device performing a second stage of a grind cycle.

The front guide assembly 220 illustrated has a body portion 222 mounted to the housing 50 and positioned above the grind surface 132 of the grind wheel 130. Referring to FIG. 6, optionally, the body portion 222 has substantially vertically extending groove 224 formed therein. An optional pivot member 226 may be mounted inside the groove 224 and configured to be pivoted relative to the body portion 222 of the front guide assembly 220. The pivot member 226 has a tethered end portion 227 pivotably coupled inside a lower portion of the groove 224 of the front guide assembly 220 by a pivot pin 229. The pivot member 226 has a free end portion 228 opposite the tethered end portion 227 that is adjacent an upper portion of the groove 224 when (as illustrated in FIG. 7) the pivot member 226 is fully positioned inside the groove 224. A drive mechanism (not shown) selectively pivots the free end portion 228 of the pivot member 226 inside and outside of the groove 224. By way of non-limited example, the pivoting drive mechanism may be constructed using a small electric motor (not shown).

Returning to FIG. 4, the first rear guide assembly 230 and the second rear guide assembly 232 are spaced apart to allow a portion of the pressure arm 140 to move therebetween as the pressure arm 140 moves longitudinally relative to the shaft 100. Each of the first and second rear guide assemblies 230 and 232 includes a movable extension portion 234 movably coupled to a substantially stationary support member 236. The extension portions 234 are each movable relative to the support member 236 between an extended position (see FIGS. 2 and 8-10) and a retracted position (see FIGS. 3-7 and 11). As illustrated in FIGS. 2 and 8-10, in the extended position, the extension portions 234 are adjacent to and may optionally contact the hard drive 20. Conversely, as illustrated in FIGS. 3-7 and 11, in the retracted position, the extension portions 234 are spaced apart from the hard drive 20.

The support member 236 are each non-movably coupled to the second section "S2" of the housing 50. In the embodiments illustrated, the support members 236 are illustrated as being attached to an upper portion of the second section "S2" of the housing 50. However, this is not a requirement and embodiments in which the support members 236 are coupled to side portions of the second section "S2" are within the scope of the present teachings.

Referring to FIG. 6, when the hard drive 20 is adjacent the front guide assembly 220, and the extension portions 234 of the first and second rear guide assemblies 230 and 232 are in the retracted position, the free end portion 228 of the pivot member 226 may be pivoted outwardly away from the groove 224 to tip or lean the hard drive 20 away from the front guide assembly 220. Conversely, referring to FIG. 8, when the hard drive 20 is in a tipped or leaned position and the free end portion 228 of the pivot member 226 is pivoted inwardly into the groove 224, the extension portions 234 of the first and second rear guide assemblies 230 and 232 may be moved into the extended position to tip the hard drive 20 upright and position it alongside the front guide assembly 220.

Returning to FIG. 4, the first side guide assembly 240 and the second side guide assembly 242 are spaced apart to allow the hard drive 20 to be inserted therebetween. Each of the first and second side guide assemblies 240 and 242 includes an movable extension portion 244 movably coupled to a substantially stationary support member 246. The extension portions 244 are each movable toward and away from the hard drive 20 to accommodate differently sized hard drives.

The support member 246 are each non-movably coupled to the second section "S2" of the housing 50. In the embodiments illustrated, the support members 246 are illustrated as being attached to an upper portion of the second section "S2" of the housing 50. However, this is not a requirement and embodiments in which the support members 246 are coupled to side portions of the second section "S2" are within the scope of the present teachings.

The extension portions 234 and extension portions 244 may each be moved as described above by a separate linear drive mechanism (not shown). Any of the linear drive mechanisms described above as suitable for constructing the linear drive mechanism 142 may be used to implement the linear drive mechanism used to move the extension portions 234 and extension portions 244. Optionally, a sensor (not shown) may be connected to each of the extension portions 234 and/or the extension portions 244 to detect when the extension portion has exerted a desired amount of force on the hard drive 20.

Referring to FIG. 2, the third section "S3" of the housing 50 defines a substantially hollow chamber 258 housing a hydraulic pump 260. The chamber 258 may be isolated from the grind chamber 90 such that the particles 30 do not enter the chamber 258. The hydraulic pump 260 may be non-movably coupled to or otherwise supported by the third section "S3" of the housing 50.

The hydraulic pump 260 is connected to the hydraulic piston 144 by a hydraulic line 262. The hydraulic pump 260 controls the operation of the hydraulic piston 144. Thus, the hydraulic pump 260 powers the pressure arm 140 that applies downwardly directed pressure to the hard drive 20 during the grinding cycle. The hydraulic pump 260 may be powered by the same utility power feed used to power the motor 60.

In the second embodiment illustrated in FIG. 15-16, the hydraulic pump 260 is connected to the hydraulic piston 160 by the hydraulic line 262. The hydraulic pump 260 controls the operation of the hydraulic piston 160. The hydraulic pump 260 powers the pressure arm 148 that applies downwardly directed pressure to the hard drive 20 during the grinding cycle.

Figure 2:
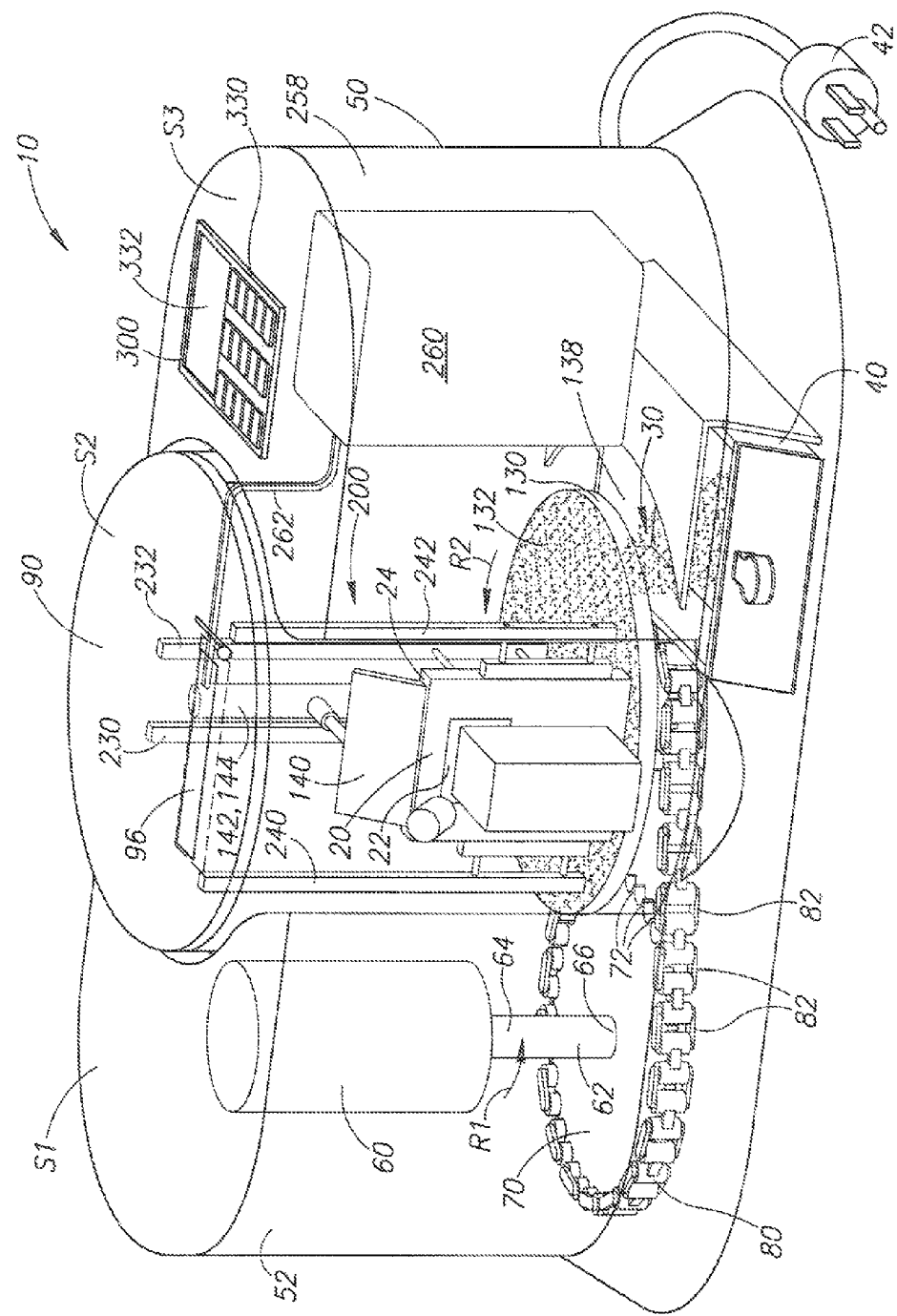
FIG. 2 is a perspective view of the device of FIG. 1 illustrated grinding a hard drive into particles and illustrated with a transparent housing to provide a view of the internal components of the device.
Figure 11:
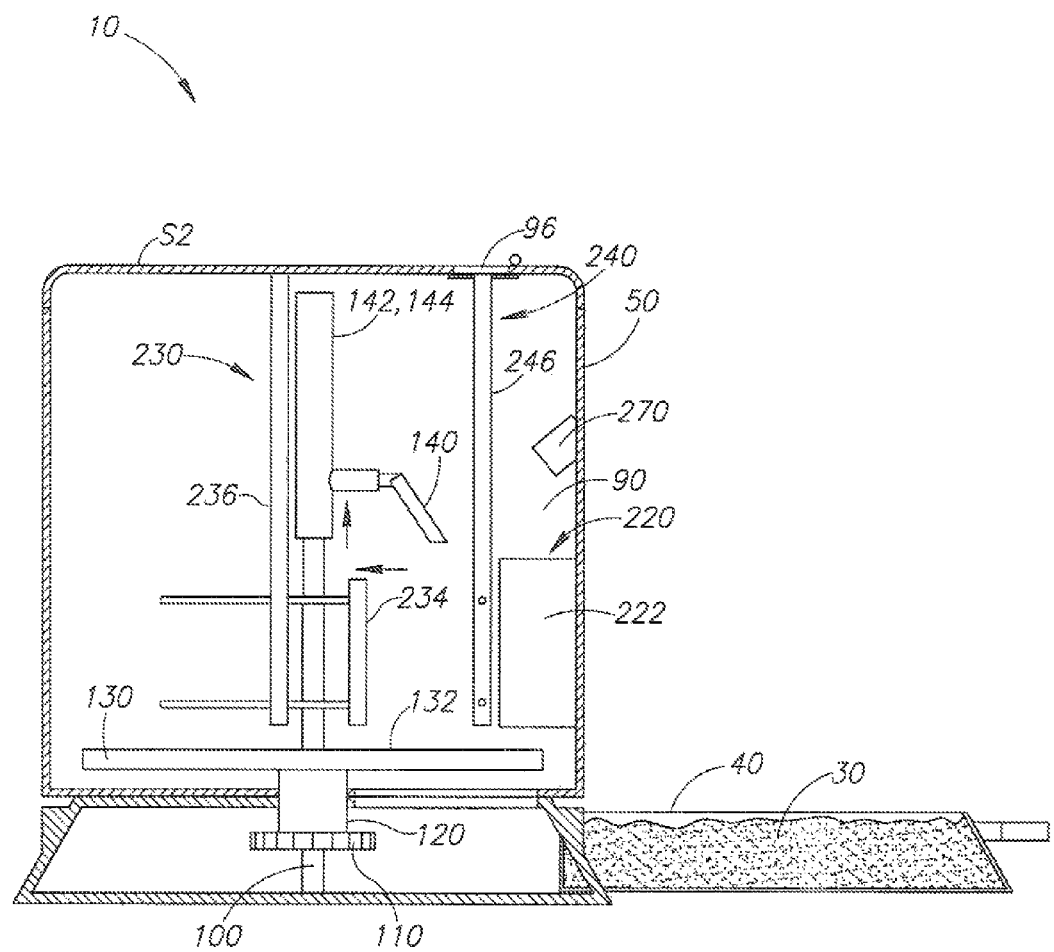
FIG. 11 is a cross section of the device of FIG. 1 taken substantially along line A-A depicting the device performing an eighth stage of a grind cycle.

Referring to FIGS. 1 and 11, the receptacle 40 may be removable from the housing 50 and emptied. In the embodiment illustrated, the receptacle 40 is implemented as a drawer slidably received inside a portion 266 (see FIG. 3) of the third section "S3" (see FIG. 3) of the housing 50. A seal (not shown) may be positioned between the housing 50 and the receptacle 40 to prevent an undesired escape of the particles 30 from the device 10. The portion 266 (see FIG. 3) of the third section "S3" receiving the receptacle 40 isolates the receptacle 40 from the chamber 258 housing a hydraulic pump 260 and the lower chamber 92 (see FIG. 5).

An exemplary grind cycle of the first embodiment of the device 10 will now be described with reference to FIGS. 5-11. A first stage of the grind cycle is illustrated in FIG. 5. In FIG. 5, the hard drive 20 is being inserted into the grind chamber 90 through the slot 96. The pivot member 226 is positioned fully within the groove 224. The pressure arm 140 is in both the disengaged position and the first longitudinal position; the extension portions 234 of the first rear guide assembly 230 and the second rear guide assembly 232 (see FIG. 4) are in retracted positions; and the extension portions 244 of the first side guide assembly 240 and the second side guide assembly 242 (see FIG. 4) are in retracted positions.

An optional second stage of the grind cycle is illustrated in FIG. 6. As illustrated in FIG. 6, in the optional second stage, the free end portion 228 of the pivot member 226 is pivoted outwardly away from the groove 224 to tip or lean the hard drive 20 away from the body portion 222 of the front guide assembly 220. Thus, the grind chamber 90 is of a suitable size to allow the hard drive 20 to be tilted before grinding commences to allow a photograph of the label 22 to be taken by the camera 270.

Figure 3:
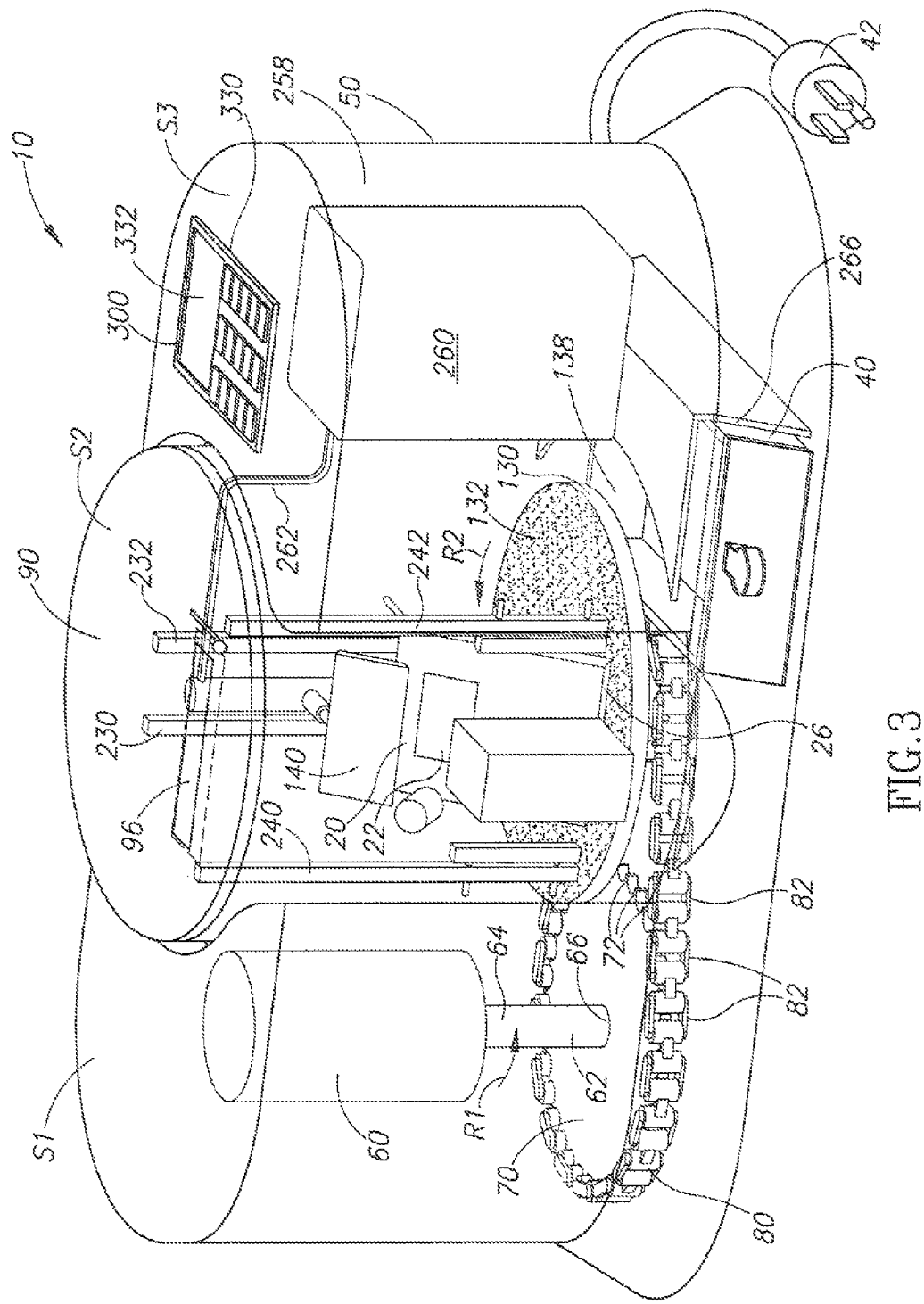
FIG. 3 is a perspective view of the device of FIG. 1 illustrated with a hard drive tilted for photographing inside a grind chamber and illustrated with a transparent housing to provide a view of the internal components of the device.

An optional third stage of the grind cycle is illustrated in FIGS. 3 and 7. As illustrated in FIG. 7, in the optional third stage, the free end portion 228 of the pivot member 226 is pivoted inwardly into the groove 224 and a photograph of the label 22 of the hard drive 20 is taken.

Together, the optional second and third stages perform a photographing process that may be considered an optional sub-cycle of the grind cycle.

A fourth stage of the grind cycle is illustrated in FIG. 8. As illustrated in FIG. 8, in the fourth stage, the extension portions 234 of the first rear guide assembly 230 and the second rear guide assembly 232 (see FIG. 4) are extended into the extended position to press the hard drive 20 against the front guide assembly 220. If the photographing process was performed before the fourth stage of the grind process, extending the extension portions 234 pushes the hard drive 20 into an upright position against the front guide assembly 220. Then, the extension portions 244 of the first side guide assembly 240 and the second side guide assembly 242 (see FIG. 4) may be moved into extended positions to engage the sides of the hard drive 20 (as shown in FIG. 2). Thus, before grinding begins, the guides 200 adjust to hold the hard drive 20 stable along its front, back, left, and right sides allowing the lower surface 26 of the hard drive 20 to be presented to the grinding surface 132 of the grind wheel 130. Then, the pressure arm 140 is moved into the engaged position to apply direct downward pressure on the upper surface 24 of the hard drive 20 pressing it onto the grind wheel 130.

Then, in a fifth stage of the grind cycle, the motor 60 (see FIG. 2) begins rotating the grind wheel 130. If the hard drive 20 is resting upon the retractable platform (not illustrated), when the drive wheel 130 reaches its full speed, the platform is retracted.

A sixth stage of the grind cycle is illustrated in FIGS. 2 and 9. As illustrated in FIG. 9, in the sixth stage, the pressure arm 140 is moved longitudinally from the first longitudinal position toward the second longitudinal position (and the grind surface 132) in the direction indicated by arrow "A." As the grind wheel 130 rotates, its grinds the particles 30 from the lower surface 26 of the hard drive 20 that are deposited in the receptacle 40. The particles 30 may be driven into the receptacle 40 by the rotational force of the grind wheel 130. Optionally, a guide (not shown), brush, comb, or the like may be positioned adjacent the grind surface 132 to clean the grind surface 132 and/or direct the particles 30 into the receptacle 40.

A seventh stage of the grind cycle is illustrated in FIG. 10. As illustrated in FIG. 10, in the seventh stage, the pressure arm 140 has been moved to the second longitudinal position (adjacent the grind surface 132) and the entire hard drive 20 or a substantial portion thereof has been ground into particles 30.

An eighth stage of the grind cycle is illustrated in FIG. 11. In the eighth stage, the motor 60 is turned off to stop the rotation of the grind wheel 130. Then, as shown in FIG. 11, the extension portions 234 of the first rear guide assembly 230 and the second rear guide assembly 232 (see FIG. 4) are returned to the retracted position. The pressure arm 140 is returned to the disengaged position. Optionally, the extension portions 244 of the first side guide assembly 240 and the second side guide assembly 242 (see FIG. 4) may be returned to their retracted positions. Further, the receptacle 40 may be removed and emptied.

Turning to FIG. 14, the device 10 includes a device controller 300. The device controller 300 includes a processor 310 connected to a memory 320 storing instructions 324 that are executable by the processor 310 and when executed by the processor control the operation of the various components of the device 10 during the grind cycle described above.

In the first embodiment illustrated, the device controller 300 is connected to the motor 60, the hydraulic pump 260, the camera 270, the first and second rear guide assemblies 230 and 232, the first and second side guide assemblies 240 and 242, and the front guide assembly 220.

The processor 310 instructs the motor 60 when to rotate the shaft 62 and when to stop rotating the shaft 62. The processor 310 instructs the camera 270 when to take a photograph and where in the memory 320 to store the photograph. In the first embodiment illustrated in FIGS. 1-14, the processor 310 also instructs the hydraulic pump 260 when to raise the hydraulic piston 144 and when to lower the hydraulic piston 144. In the second embodiment illustrated in FIGS. 15 and 16, the processor 310 instructs the hydraulic pump 260 when to raise the hydraulic piston 160 and when to lower the hydraulic piston 160.

The processor 310 instructs the linear drive mechanisms (not shown) of the extension members 234 of the first and second rear guide assemblies 230 and 232 when to position the extension members in the extended and retracted positions. Further, the processor 310 may receive a signal from sensors (not shown) connected to the extension members 234 indicating how much force the extension members 234 are exerting on the hard drive 20. The processor 310 may use this signal to determine when to stop moving the extension members 234 toward the hard drive 20.

The processor 310 instructs the linear drive mechanisms (not shown) of the extension members 244 of the first and second side guide assemblies 240 and 242 when to position the extension members in the extended and retracted positions. Further, the processor 310 may receive a signal from sensors (not shown) connected to the extension members 244 indicating how much force the extension members 244 are exerting on the hard drive 20. The processor 310 may use this signal to determine when to stop moving the extension members 234 toward the hard drive 20.

The processor 310 instructs the drive mechanism (not shown) of the front guide assembly 220 when to selectively position the free end portion 228 of the pivot member 226 inside and outside of the groove 224.

In the second embodiment illustrated, the device controller 300 is connected to the pressure arm 140. The processor 310 instructs the linear drive mechanism (not shown) of the pressure member 140 when to move the pressure arm 140 laterally relative to the shaft 100 to position the pressure arm 140 in the disengaged position (illustrated in FIGS. 3-7 and 11) or the engaged position (illustrated in FIGS. 2 and 8-10).

The device controller 300 may include a user interface 330 (e.g., a touch sensitive display screen 332) connected to the processor 310. The user interface 330 is configured to receive user input and transmit instructions based on the user input to the processor 310. The processor 310 is configured to receive the instructions from the user interface 330 and instruct the appropriate components of the device 10 to perform actions desired by the user. For example, the user interface 330 may be used to instruct the processor 310 to perform the stages of the grind cycle occurring after the hard drive 20 has been inserted into the grind chamber 90 in the first stage (illustrated in FIG. 5). By way of another example, the user interface 330 may be used to instruct the processor 310 to perform the photographing process during the grind cycle. Thus, the user interface 330 may be used to instruct the camera 270 to photograph the hard drive 20 (as illustrated in FIG. 7).

The user interface 330 may also allow the user to connect to an external computing subsystem 340 (e.g., a LAN, WAN, Internet, and the like) via a network interface 350 coupled to the processor 310. For example, the user interface 330 may be used to instruct the processor 310 to store (and optionally sign) the digital photograph (captured during the photographing process of the grind cycle) on an external memory or computing device coupled to the computing subsystem 340. The network interface 350 may include an Internet connection configured to implement Internet Protocol ("IP") based file transfer.

The user interface 330 may be used to perform file transfer operations to store the photograph outside the device 10. For example, the device controller 300 may include an I/O port 360 (such as a USB port or similar connection for external memory). The user interface 330 may allow the user to transfer the photograph to an external memory 370 via the I/O port 360.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations).

Accordingly, the invention is not limited except as by the appended claims.

The invention claimed is:

1. A system for destroying a computer hard drive having data stored thereon, the system comprising:
   a grind chamber;
   a rotatable abrasive grind wheel positioned inside the grind chamber, the grind wheel being configured to support the computer hard drive when the computer hard drive is positioned inside the grind chamber;
   a pressure arm configured to press the computer hard drive against the grind wheel as the grind wheel rotates and grinds the computer hard drive into particles from which the data stored on the computer hard drive cannot be recovered;
   a motor configured to rotate the grind wheel as the grind wheel grinds the computer hard drive into particles; and
   a receptacle adjacent the grind wheel positioned to receive the particles.

2. The system of claim 1, further comprising:
   a camera operable to capture an image of the computer hard drive before the computer hard drive is ground into the particles.

3. The system of claim 2, further comprising:
   a device controller configured to instruct the camera to capture the image of the computer hard drive.

4. The system of claim 1, further comprising:
   a device controller configured to instruct the motor when to rotate the grind wheel and when not to rotate the grind wheel.

5. The system of claim 1, further comprising:
   a drive chain connecting the motor to the grind wheel, the grind wheel being rotatable by the drive chain, and the drive chain being rotatable by the motor, the drive chain rotating the grind wheel when rotated by the motor.

6. The system of claim 1, further comprising:
   a plurality of guides configured to maintain the computer hard drive in a substantially stationary position relative to the pressure arm as the grind wheel rotates.

7. The system of claim 1, wherein the pressure arm is moveable between an upper position and a lower position, and the system further comprises:
   a hydraulic pump connected to the pressure arm, the hydraulic pump being configured to selectively position the pressure arm in the upper position to engage an upper portion of the computer hard drive and selectively lower the pressure arm toward the lower position to cause the pressure arm to bear against the upper portion of the computer hard drive and press the computer hard drive against the grind wheel as the grind wheel rotates.

8. The system of claim 7, wherein the hydraulic pump is further configured to raise the pressure arm to the upper position from the lower position after the computer hard drive has been ground into particles.

9. The system of claim 1, wherein the abrasive grind wheel comprises grit.

10. The system of claim 1 for use with the computer hard drive being constructed from a material, wherein the grind wheel is deformation resistant to the material used to construct the computer hard drive.

11. A portable system for destroying a computer hard drive storing data, the system comprising:
    a rotatable abrasive grind wheel configured to support the computer hard drive;
    means for pressing the computer hard drive against the grind wheel as the grind wheel rotates to grind away a portion of the computer hard drive to form particles of ground computer hard drive;
    means for rotating the grind wheel as the grind wheel grinds the computer hard drive into particles; and
    means for retaining the particles of ground computer hard drive inside the system.

12. The system of claim 11, further comprising:
    means for maintaining the computer hard drive in a substantially stationary position as the grind wheel rotates.

13. The system of claim 11, wherein the abrasive grind wheel comprises grit.

14. The system of claim 11 for use with the computer hard drive being constructed from a material, wherein the grind wheel is deformation resistant to the material used to construct the computer hard drive.

* * * * *